(12) United States Patent
Schat (10) Patent No.: US 11,502,843 B2
(45) Date of Patent: Nov. 15, 2022

(54) ENABLING SECURE INTERNET TRANSACTIONS IN AN UNSECURE HOME USING IMMOBILE TOKEN

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 960 days.

(21) Appl. No.: 16/237,633

(22) Filed: Dec. 31, 2018

(65) Prior Publication Data

US 2020/0213119 A1 Jul. 2, 2020

(51) Int. Cl.
| | | |
|---|---|---|
| H04L 9/32 | (2006.01) | |
| H04W 12/64 | (2021.01) | |
| G06Q 20/36 | (2012.01) | |
| G06Q 20/10 | (2012.01) | |

(52) U.S. Cl.
CPC ......... H04L 9/3234 (2013.01); G06Q 20/108 (2013.01); G06Q 20/363 (2013.01); *H04L 2209/127* (2013.01); *H04W 12/64* (2021.01)

(58) Field of Classification Search
None
See application file for complete search history.

(56) References Cited

U.S. PATENT DOCUMENTS

| | | | |
|---|---|---|---|
| 7,401,218 B2 | 7/2008 | Park | |
| 7,844,818 B2 | 11/2010 | Park | |
| 8,171,531 B2 | 5/2012 | Buer | |
| 9,305,149 B2 | 4/2016 | Grigg et al. | |
| 9,775,034 B2 | 9/2017 | Hekstra et al. | |
| 10,097,560 B1* | 10/2018 | Shavell | H04L 63/20 |
| 10,587,595 B1* | 3/2020 | Naef | H04L 9/006 |
| 2009/0224909 A1* | 9/2009 | Derrick | G08B 21/22 |
| | | | 340/539.13 |
| 2010/0325236 A1* | 12/2010 | Savinen | G06F 9/4415 |
| | | | 709/217 |

(Continued)

OTHER PUBLICATIONS

"Recommendations for the Security of Internet Payments", European Central Bank, 16 pgs., retrieved from the internet Dec. 21, 2018 at: https://www.ecb.europa.eu/pub/pdf/other/recommendationssecurityinternetpaymentsoutcomeofpcfinalversionafterpc201301en.pdf?95e6bba1ef875877ad3c35cf3b12399c (Jan. 2013).

(Continued)

*Primary Examiner* — Michael Pyzocha (57) ABSTRACT

This specification discloses devices and methods for a security concept that includes an immobile hardware token (e.g., a "wall token" that is fixed within a wall) which ensures that the more sensitive actions of electronic banking (e.g., money transfers of large sums to foreign bank accounts) can only be done from the account owner's home, but not from a remote place. However, other less sensitive (and lower security risk) actions can still be done from anywhere else. In some embodiments, the hardware token includes sensors to ensure that the token is not moved or tampered with, interfaces to provide distance bounding, and a crypto-processor to provide secure authentication. The distance bounding can be used to determine if the authentication device is in close proximity to the hardware token, which can in turn ensure that the authentication device is within the account owner's home.

18 Claims, 9 Drawing Sheets

(56) References Cited

U.S. PATENT DOCUMENTS

| | | | | |
|---|---|---|---|---|
| 2011/0078549 | A1* | 3/2011 | Thueringer | H04L 9/3271 713/168 |
| 2014/0019768 | A1* | 1/2014 | Pineau | H04L 9/3231 713/186 |
| 2014/0223516 | A1* | 8/2014 | Vongsouvanh | H04L 63/0815 726/4 |
| 2014/0279546 | A1* | 9/2014 | Poole | G06Q 20/3226 705/44 |
| 2015/0142667 | A1* | 5/2015 | Landrok | G06Q 20/326 705/67 |
| 2016/0119320 | A1* | 4/2016 | Bansal | G06Q 30/0248 705/14.47 |
| 2016/0128105 | A1* | 5/2016 | Dunsbergen | H04W 4/80 370/329 |
| 2016/0182529 | A1* | 6/2016 | Biehl | H04W 12/08 726/1 |
| 2016/0352751 | A1* | 12/2016 | Perrufel | H04L 67/10 |
| 2017/0171754 | A1* | 6/2017 | South | H04W 4/02 |
| 2017/0302248 | A1* | 10/2017 | Feng | G01S 5/14 |
| 2017/0318460 | A1* | 11/2017 | Kumar | H04B 10/116 |
| 2018/0059208 | A1* | 3/2018 | Hamada | G01S 11/06 |
| 2018/0144567 | A1* | 5/2018 | Bradley | H04B 11/00 |
| 2018/0240371 | A1 | 8/2018 | Schwar et al. | |
| 2018/0285546 | A1* | 10/2018 | Greenberg | H04L 9/0891 |
| 2019/0028484 | A1* | 1/2019 | Truong | H04L 63/0853 |
| 2020/0349571 | A1* | 11/2020 | Patel | G06Q 30/06 |
| 2020/0401857 | A1* | 12/2020 | Lu | G06K 9/6292 |
| 2021/0383624 | A1* | 12/2021 | Hoyer | G07C 9/00563 |
| 2022/0207947 | A1* | 6/2022 | Buck | G07C 9/257 |

OTHER PUBLICATIONS

Brennan, M. "How Safe is Wechat Pay", China Channel, 2 pgs., retrieved from the internet Dec. 21, 2018 at: https://chinachannel.co/how-safe-is-wechat-pay/ (Jan. 2, 2016).

"2017 Global Cyber Attack Trends Report", Check Point Research, 27 pgs, retrieved from the internet Dec. 21, 2018 at: https://www.checkpoint.com/downloads/product-related/infographic/H2_2017_Global_Cyber_Attack_Trends_Report.pdf (2017).

U.S. Appl. No. 16/051,558, (filed Aug. 1, 2018).

* cited by examiner

|  | Home | Mobile |
|---|---|---|
| Authentication | 2-factor + Hardware Token | 2-factor |
| Money transfer per day to previously authorized accounts | High amount | High amount |
| Money transfer per day to any account | High amount | Lower amount |
| Asking for higher credit line or higher daily transfer limit | Allowed | Not Allowed |
| Re-order lost items for 2-factor authentication | Allowed | Not Allowed |
| Add permissions as given in this table | Allowed | Not Allowed |
| Revoke permissions as given in this table | Allowed | Allowed |

FIG. 4

| Authentication | Home | Mobile |
| --- | --- | --- |
|  | 2-factor + Hardware Token | 2-factor |
| E-mail | Unrestricted, e.g. change payment options, change forwarding policy, change out-of-office message | Only send and receive email |
| Social networks | Unrestricted, e.g. upload and download any contents, send messages to anyone, download address books | Only post messages at a pinboard |
| File sharing | Unrestricted | Not Allowed |
| Minor software updates | Unrestricted | Not Allowed |

ENABLING SECURE INTERNET TRANSACTIONS IN AN UNSECURE HOME USING IMMOBILE TOKEN

FIELD

The described embodiments relate generally to devices and methods for enabling secure internet transactions, and more particularly to devices and methods for enabling secure internet transactions in an unsecure building using an immobile hardware token.

BACKGROUND

Secure internet transactions are very important to users, especially users of electronic banking.

Electronic banking (or online banking) is an electronic payment system that enables customers of a bank or other financial institution to conduct a range of financial transactions through the financial institution's website. Access is usually through a secure web site using a username and password, but security is a key consideration in electronic banking and many banks also offer two factor authentication using a security token.

Security of a customer's financial information is very important, without which electronic banking could not operate. Therefore, there are strong needs for devices and methods that can provide enhanced secure internet transactions for electronic banking and other internet transactions.

SUMMARY

This specification discloses devices and methods for a security concept that includes an immobile hardware token (e.g., a "wall token" that can be fixed within a wall) which ensures that the more sensitive actions of electronic banking (e.g., money transfers of large sums to foreign bank accounts) can only be done from the account owner's home, but not from a remote place. However, other less sensitive (and lower security risk) actions can still be done from anywhere else.

In some embodiments, the hardware token includes sensors to ensure that the token is not moved or tampered with, interfaces to provide distance bounding, and a crypto-processor to provide secure authentication. The distance bounding can be used to determine if the authentication device is in close proximity to the hardware token, which can in turn ensure that the authentication device is within the account owner's home.

In some embodiments, this security concept can also be applied to other internet transactions, where higher security risk functions can only be done from the account owner's home, but not from a remote place. However, other less sensitive (and lower security risk) actions can still be done from anywhere else. Once again, the hardware token can be used to determine if the authentication device is within the account owner's home.

The present invention provides for an immobile hardware token for enabling secure internet transactions, the immobile hardware token comprising: (a) a first sensor configured to detect if the hardware token is moved; (b) a second sensor configured to detect if the hardware token is tampered with; (c) a first interface configured to provide distance bounding; (d) a second interface configured to interact with an authentication device; (e) a crypto-processor configured to provide for secure authentication.

In some embodiments, the hardware token is configured to be fixed on or fixed in a permanent structure of a building.

In some embodiments, the permanent structure of the building is one or more of the following: (i) a wall, (ii) a ceiling, (iii) a foundation, (iv) ground upon which the building stands, (v) any structure that is permanently attached to the building.

In some embodiments, the first sensor is further configured to detect if the hardware token is fixed on or fixed in the permanent structure of the building.

In some embodiments, the first sensor is configured to detect if the hardware token is fixed on or fixed in the permanent structure of the building by using one or more of the following: (i) ultrasound echo sensing, (ii) force sensing, (iii) motion sensing, (iv) vibration sensing, (v) temperature sensing.

In some embodiments, the second interface is further configured to interact with a second authentication device.

In some embodiments, the hardware token is configured to be used as a location-based factor for multi-factor authentication.

In some embodiments, the second sensor is configured to detect if the hardware token is mechanically tampered with by using one or more of the following: (i) light sensing, (ii) mechanical sensing.

In some embodiments, the authentication device is comprised of one of the following: (i) a personal computer, (ii) a card reader, (iii) a mobile phone, (iv) a smart phone, (v) a biometric detector, (vi) a dedicated TAN (transaction authentication number) generator, (vii) any other type of mobile device.

In some embodiments, the crypto-processor is configured to provide for secure challenge/response authentication.

In some embodiments, the first sensor comprises one or more temperature sensors, wherein the one or more temperature sensors are configured to detect a temperature of the hardware token or a temperature gradient across the hardware token, wherein a fast and/or sudden change in the temperature of the hardware token or the temperature gradient across the hardware token indicates that the hardware token has been moved from the permanent structure of the building that the hardware token is fixed on or fixed in.

In some embodiments, the hardware token further comprising a dedicated input element.

In some embodiments, the distance bounding is configured to prevent and/or detect a relay channel attack.

The present invention provides for a method for using an immobile hardware token for enabling secure internet transactions, the method comprising: (a) using an authentication device to authenticate a user; (b) using the immobile hardware token to authenticate close proximity of the authentication device to the hardware token, wherein the immobile hardware token comprises: (i) a first sensor configured to detect if the hardware token is moved, (ii) a second sensor configured to detect if the hardware token is tampered with, (iii) a first interface configured to provide distance bounding, wherein the distance bounding is configured to determine if the authentication device is in close proximity to the hardware token, (iv) a second interface configured to interact with the authentication device, (v) a crypto-processor configured to provide for secure authentication.

In some method embodiments, the method further comprising: (c) authenticating, by the hardware token, that the authentication device is in close proximity to the hardware token, wherein the distance bounding has determined that the authentication device is within a pre-determined distance of the hardware token.

In some method embodiments, the authentication device is comprised of one of the following: (i) a personal computer, (ii) a card reader, (iii) a mobile phone, (iv) a smart phone, (v) a biometric detector, (vi) a dedicated TAN (transaction authentication number) generator, (vii) any other type of mobile device.

In some method embodiments, the method further comprising: (d) using a second authentication device to authenticate the user; (e) using the immobile hardware token to authenticate close proximity of the second authentication device, wherein the immobile hardware token comprises: (iii) the first interface configured to provide distance bounding, wherein the distance bounding is configured to determine if the second authentication device is in close proximity to the hardware token.

In some method embodiments, security of an internet transaction conducted by the authentication device is increased if the hardware token has authenticated that the authentication device is in close proximity to the hardware token, wherein the increased security of the internet transaction conducted by the authentication device enables the authentication device to perform higher risk functions that would otherwise not be authorized.

In some method embodiments, the internet transaction conducted by the authentication device is comprised of banking functions, wherein the higher risk functions are comprised of higher risk banking functions.

In some method embodiments, the internet transaction conducted by the authentication device is comprised of one or more of the following: (i) banking functions, (ii) authentication functions, (iii) email functions, (iv) social network functions, (v) file sharing functions, (vi) software update functions, (vii) internet ordering of items and/or services.

The present invention provides for a computer program product comprising executable instructions encoded in a non-transitory computer readable medium which, when executed by an immobile hardware token, carry out or control a method for using the immobile hardware token for enabling secure internet transactions, the method comprising: (a) using an authentication device to authenticate a user; (b) using the immobile hardware token to authenticate close proximity of the authentication device to the hardware token, wherein the immobile hardware token comprises: (i) a first sensor configured to detect if the hardware token is moved, (ii) a second sensor configured to detect if the hardware token is tampered with, (iii) a first interface configured to provide distance bounding, wherein the distance bounding is configured to determine if the authentication device is in close proximity to the hardware token, (iv) a second interface configured to interact with the authentication device, (v) a crypto-processor configured to provide for secure authentication.

The present invention provides for a computer program product comprising executable instructions encoded in a non-transitory computer readable medium which, when executed by an authentication device, carry out or control a method for using an immobile hardware token for enabling secure internet transactions, the method comprising: (a) using the authentication device to authenticate a user; (b) using the immobile hardware token to authenticate close proximity of the authentication device to the hardware token, wherein the immobile hardware token comprises: (i) a first sensor configured to detect if the hardware token is moved, (ii) a second sensor configured to detect if the hardware token is tampered with, (iii) a first interface configured to provide distance bounding, wherein the distance bounding is configured to determine if the authentication device is in close proximity to the hardware token, (iv) a second interface configured to interact with the authentication device, (v) a crypto-processor configured to provide for secure authentication.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Electronic banking (or e-banking, or online banking, or internet banking) today relies on multi-factor authentication using separate independent channels, e.g. (a) PC (personal computer) and card reader, or (b) PC and mobile phone. While this multi-factor authentication together with heuristic fraud detection can address known security threats, one more threat is upcoming due to the more and more frequent practice of renting a home to unknown people (as, for example, mediated by the popular AirBNB service, which has a record of many millions of check-ins). This practice may involve the threat that a malicious guest may use the long time he/she can live in the victim's apartment to conduct attacks that are otherwise not possible, because they require some days between reporting items to be lost, and receiving and using them. Therefore, the threat can be that a malicious guest may on the one hand compromise the host's PC, and may on the other hand report to the host's bank that items belonging to a second authentication channel as lost, and re-order them, using a counterfeit signature of the host and the host's mailbox. That way, all authentication channels are corrupted, and the guest has free access to the host's bank account.

Fraud detection heuristics by the bank, and supervision of the bank account by the (remote) account owner make it very risky for the guest to launch his attack from the host's home, since the risk is that either the bank or the host has informed the police, which can just come to the host's home to arrest the guest.

The guest will therefore prefer to launch the attack at a secure place outside the host's home, taking with him the host's PC and the second channel authentication items.

There is, therefore, the need to split the e-banking access rights: by providing full access to the bank account only from the account owner's home, while restricting it for access from outside the home. This requires a secure identification whether the account is actually being accessed from home. This identification can be provided by an item that is irreversibly fixed in the owner's home, issuing a warning upon any attempt to tamper or move it.

Additionally, multi-factor authentication can utilize a location-based factor, where the location of a user can be used to authenticate a user. For example, a system can authenticate a user by determining that a user is accessing the system from within the user's home, or from the user's office.

However, standard IoT (Internet of things) devices cannot be used in such a manner, so this specification discloses devices and methods for providing authentication that a user is actually situated within a particular physical location, such as a home or an office.

In particular, to overcome the previously mentioned threat, this specification discloses a security concept that includes a hardware token (e.g., a "wall token") which ensures that the more sensitive actions of e-banking (e.g., money transfers of large sums to foreign bank accounts) can only be done from the account owner's home, but not from a remote place. However, other less sensitive (and lower security risk) actions can still be done from anywhere else.

Figure 1A:
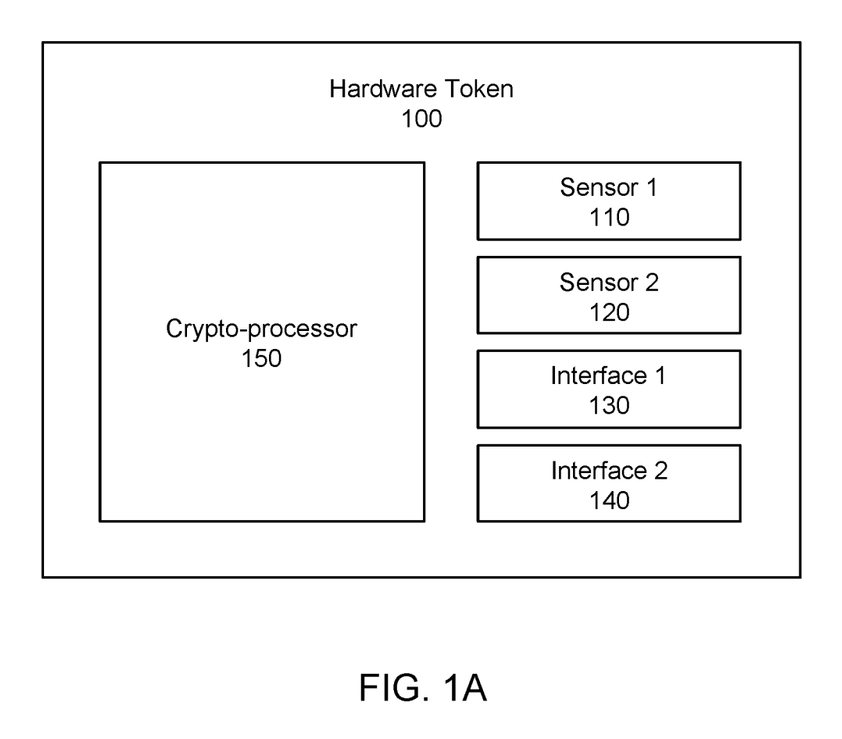
FIG. 1A shows a functional block diagram of an immobile hardware token (in a first embodiment), in accordance with some embodiments of the invention.
Figure 1B:
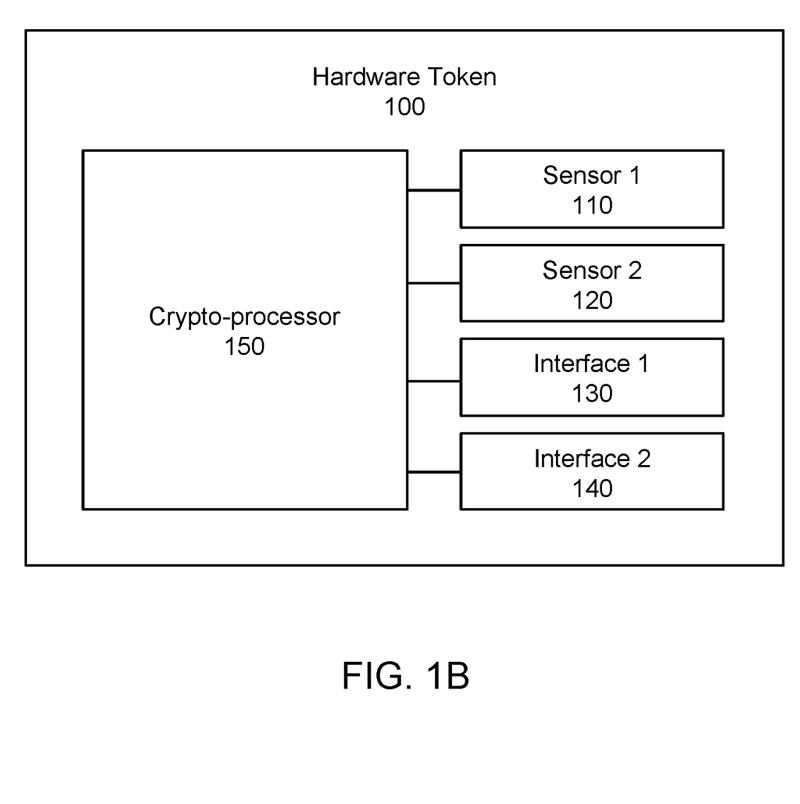
FIG. 1B shows a functional block diagram of an immobile hardware token (in a second embodiment), in accordance with some embodiments of the invention.

FIGS. 1A and 1B show two examples of such an immobile hardware token, in accordance with some embodiments of the invention. The hardware token needs to be immobile, so that a fraudulent user cannot simply move the hardware token away from the account owner's home.

In detail, this immobile hardware token (e.g., a "wall token") can include:

(a) Sensors that detect if the wall token is: (i) mounted in a wall (e.g., by ultrasound echo sensing), (ii) fixed at the wall with necessary force (e.g., by a force sensor), (iii) not moved (e.g., by a motion/vibration sensor), (iv) not tampered with (e.g., by light and mechanical sensors).

(b) Interfaces for distance bounding to detect a possible relay channel attack.

(c) Interfaces to interact with the PC and the 2nd authentication factor (e.g., ID-card reader).

(d) A crypto-processor to provide a secure challenge/response authentication.

This hardware token can form an additional factor for a multi-factor authentication system.

It is extremely unlikely that a wall token can become lost, defective, or destroyed, so that re-ordering it from the bank should be made difficult (e.g., with the requirement that the legitimate bank account owner present himself in person at a bank office for the re-ordering). This specification also discloses a way to build such a wall token and to integrate the wall token into a security concept that provides different rights for e-banking from the account owner's home versus e-banking from outside the home.

FIG. 1A shows a functional block diagram of an immobile hardware token (in a first embodiment), in accordance with some embodiments of the invention.

In FIG. 1A, an immobile hardware token 100 is shown to include a first sensor 110, a second sensor 120, a first interface 130, a second interface 140, and a crypto-processor 150. In some embodiments, the first sensor 110 can be configured to detect if the hardware token is moved (e.g., moved away from a fixed physical location within a building, such as a wall in a home). In some embodiments, the second sensor 120 can be configured to detect if the hardware token is tampered with (e.g., either mechanical tampering to alter the hardware token, or electronic/software tampering to alter the hardware token). In some embodiments, the first interface 130 can be configured to provide distance bounding (i.e., the distance bounding is used to determine if an authentication device is in close proximity to the hardware token, and the distance bounding is also used to prevent and/or detect a relay channel attack). In some embodiments, the second interface 140 can be configured to interact with an authentication device (i.e., the hardware token uses the second interface to interact with an authentication device, for the purpose of authenticating the authentication device). In some embodiments, the crypto-processor 150 can be configured to provide for secure authentication (i.e., the crypto-processor can be used to authenticate the authentication device). In some embodiments, the crypto-processor can perform authentication using an authentication method via PKI (public key infrastructure), FIDO (Fast IDentity Online), or a similar method.

The hardware token 100 of FIG. 1A can also include other components, other interfaces, and connections between components and interfaces, but these are not shown in detail in order to avoid unnecessarily obscuring the described embodiments.

FIG. 1B shows a functional block diagram of an immobile hardware token (in a second embodiment), in accordance with some embodiments of the invention. FIG. 1B is similar to FIG. 1A, but FIG. 1B shows a possible set of connections between the components and interfaces.

In particular, FIG. 1B also shows that an immobile hardware token 100 includes a first sensor 110, a second sensor 120, a first interface 130, a second interface 140, and a crypto-processor 150. Additionally, FIG. 1B shows that the 4 "non-processor" components/interfaces (i.e., the first sensor 110, the second sensor 120, the first interface 130, and the second interface 140) are all directly connected to the crypto-processor 150.

It is not shown in FIGS. 1A and 1B, but other architectures (such as a bus architecture) are also possible for the components/interfaces of the immobile hardware token 100.

In general, an immobile hardware token can include the following components/interfaces/features:

(a) A sensor (such as a first sensor 110) that detects if the hardware token is mounted in a wall, e.g. by ultrasound impulse/echo method.

(b) A sensor (such as a first sensor 110) that detects if the hardware token is fixed at a wall with necessary force (e.g., by a force sensor). In other embodiments, a force sensor can detect forceful movement, instead detecting a force that fixes the hardware token at the wall.

(c) A sensor (such as a first sensor 110) that detects if the hardware token is moved (e.g., by a motion/vibration sensor).

(d) A sensor (such as a second sensor 120) that detects if the hardware token is opened or otherwise mechanically tampered (e.g., by light or mechanical sensors).

(e) Temperature sensors (which can be a part of a first sensor 110) at both ends of the hardware token can be configured to detect a temperature of the hardware token or a temperature gradient across the hardware token. As walls can be known to be good temperature conductors, the temperature can be nearly the same at both temperature sensors. Therefore, the temperature should change only slightly with time. Otherwise, it is likely that the hardware token has been removed from the wall. As such, a fast and/or sudden change in the temperature of the hardware token or the temperature gradient across the hardware token can indicate that the hardware token has been moved from the wall that the hardware token is fixed on or fixed in. Therefore, this can also serve as some additional tampering detection.

(f) Distance bounding can use, for example, UWB (ultra-wideband or ultra-wide band) to detect a relay channel attack. Both the distance of a PC to the hardware token (i.e., 1st authentication factor—a first authentication device) and the distance of a 2nd factor to the hardware token (i.e., 2nd authentication factor—a second authentication device) need to be securely determined to be within a limit of, for example, 2-5 m.

(g) The present invention can also include these two measures to detect and to prevent attacks to the distance bounding scheme: (i) measuring the bandwidth of the UWB pulse, wherein a bandwidth higher than allowed by the regulations indicates an illegitimate transmitter and hence an attempted attack, and (ii) obfuscating the transmitted UWB signal with artificial noise to make it impossible for the attacker to conclude the remaining signals, and to transmit such a signal with increased bandwidth.

(h) Interfaces to interact both with the account owner's PC (i.e., 1st authentication factor) and the 2nd authentication factor (which, for example, can be an ID-card reader or a smartphone).

(i) A keyboard or other input element which makes sure that a person needs to be present during e-banking, such that it cannot be automated or remotely controlled from outside the home. In some embodiments, this can be a dedicated input element.

(j) A crypto-processor to provide a secure challenge/response authentication.

(k) A rechargeable battery and an inductive power link for recharging the battery once the hardware token is mounted on (and/or mounted in) the wall.

The hardware token is preferably a one-chip solution or a multi-chip module (with the sensors on separate chips), but less favorably a multi-IC solution with several ICs (integrated circuits) on a PCB (printed circuit board). The reason is that the communication between the different ICs could be easily compromised.

Figure 2A:
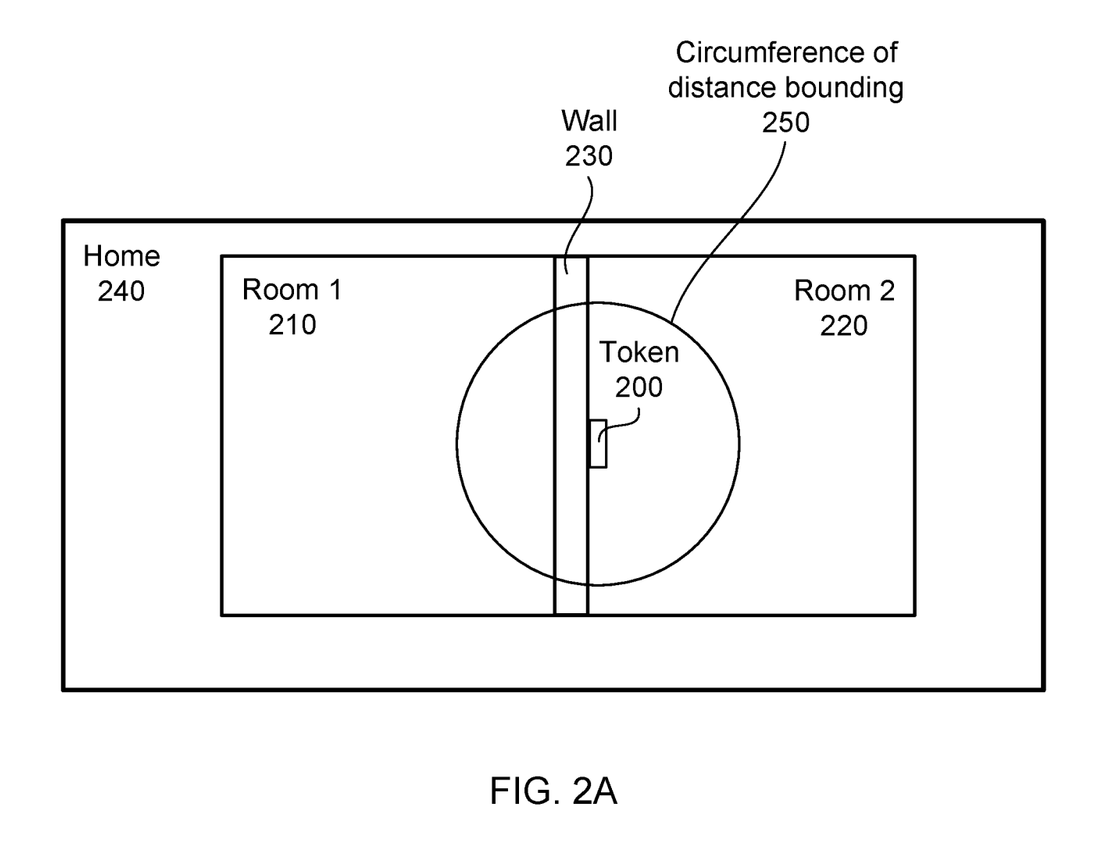
FIG. 2A shows a hardware wall token (that is "fixed on" a wall in a home) and a circumference of distance bounding, in accordance with some embodiments of the invention.

FIG. 2A shows a hardware wall token (that is fixed on a wall in a home) and a circumference of distance bounding, in accordance with some embodiments of the invention. In some embodiments, it can be assumed that this is the home of an account owner, such as a bank account owner.

FIG. 2A shows that a home 240 (or, in general, a building) can include two rooms: a first room 210 and a second room 220. A wall 230 is situated between the two rooms. In FIG. 2A, a hardware wall token 200 is mounted (or fixed) on the wall 230. A circumference 250 of distance bounding for the hardware wall token 200 is also shown in FIG. 2A. The circumference 250 of distance bounding can be used to determine if an authentication device is within a pre-determined distance of the hardware wall token. In some embodiments, if an authentication device is determined to be within a pre-determined distance of the hardware wall token, then the hardware wall token can authenticate that the authentication device is in close proximity to the hardware wall token. This, in turn, can be used to provide authentication that a user (who is the account owner) is actually situated within a particular physical location, which is the user's home (or the account owner's home) in this example.

Note that in FIG. 2A, the circumference 250 of distance bounding has to be "small enough" so that one can make sure that the "home" zone is indeed restricted to the account owner's home, so that a possible attack cannot be launched from rooms in the neighborhood.

"Distance bounding" is a technique to ensure that two items are in proximity to each other, e.g. less than 2 m distance. Unlike distance measurement, distance bounding only verifies if a maximum distance is exceeded or not, without providing a value or estimate of the distance. Distance bounding typically uses Time-of-Flight measurement of UWB (ultra-wide band) impulses. The technique is considered very robust against attacks. The few attack mechanisms that exist can be detected and prevented with standard measures.

In one prevention measure, artificial noise can be added to the transmitted UWB signal in order to make it impossible for an attacker to predict the following part of the signal, upon which the attacker could transmit a similar signal with a higher bandwidth than the legitimate transmitter is allowed to use according to the regulations. In this case, the attacker would gain a timing benefit and could pretend a distance that is lower than the actual distance.

In another prevention measure, the attack scenarios can be countered by measuring the bandwidth of the received UWB signal. If the bandwidth of this signal exceeds the bandwidth allowed by the regulations, then the receiver can conclude that the transmitter violates the regulations and is an illegitimate transmitter. The receiver would in this case not confirm the requested authentication and would not grant the requested privileges.

Therefore, this and other methods can be implemented to make "distance bounding" even more safe against the known attack mechanisms.

The example shown in FIG. 2A has one drawback, because the hardware wall token is mounted (or fixed) on a wall in a home, so the hardware wall token might be visible (and/or obvious) to a malicious long-term home sharing guest, or the hardware wall token might be easily searchable by a malicious home sharing guest. Furthermore, being mounted (or fixed) on a wall in a home, the hardware wall token might also be easily accessible to a malicious home sharing guest. Therefore, it might be beneficial to hide the hardware wall token within the wall.

Figure 2B:
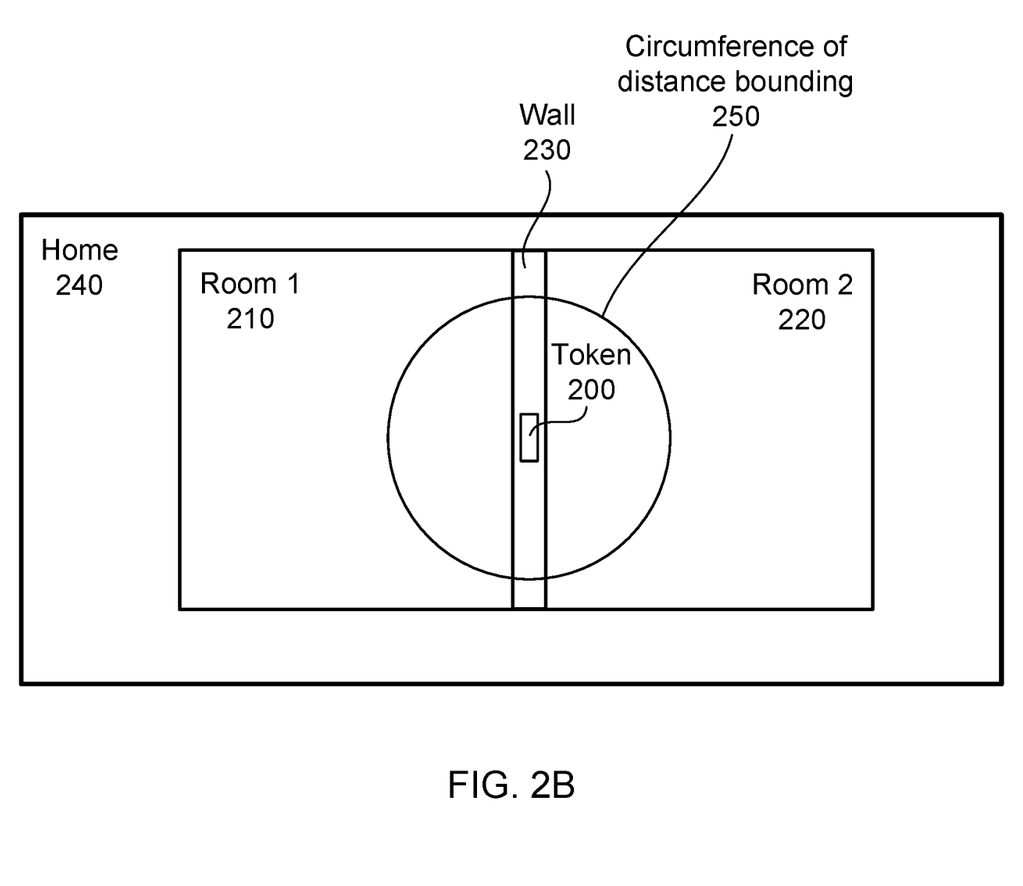
FIG. 2B shows a hardware wall token (that is "fixed within" a wall in a home) and a circumference of distance bounding, in accordance with some embodiments of the invention.

As an example, in order to overcome the drawbacks of FIG. 2A, FIG. 2B shows a hardware wall token (that is fixed within a wall in a home) and a circumference of distance bounding, in accordance with some embodiments of the invention.

FIG. 2B is similar to FIG. 2A in all ways, except in FIG. 2B the hardware wall token is fixed within a wall in a home. Specifically, FIG. 2B shows that a hardware wall token 200 is mounted (or fixed) in the wall 230. Now, the hardware wall token will not be visible (and/or obvious) to a malicious home sharing guest. The hardware wall token will also not be easily accessible to a malicious home sharing guest.

In some embodiments, the hardware token (or wall token) may be, for example, 10 mm in diameter, and 5 cm in length. To mount (or fix) it in the wall, a hole with 11 mm diameter, 6 cm length can be drilled. The hardware token (or wall token) is then inserted inside the hole, and the remaining 1 cm is completely filled with a filling material. When mounted in such a manner, the hardware token would not noticeable for a malicious home sharing guest. The advantage of this approach is the additional obscurity, since the malicious guest does not know that a hardware token exists, and hence needs to put in some effort and time into detecting and finding it.

In FIGS. 2A and 2B, the example given is that the immobile hardware token can be fixed on or fixed in a wall of a home. But, in general, the immobile hardware token can be fixed on or fixed in a permanent structure of a building, where the building can be a home, an office, a factory, a hospital, or any location that can justify a higher security rating for a user to be accessing an account from that particular location. For example, an office might justify a higher security rating for work-related internet transactions. As another example, a hospital might justify a higher security rating for medical-related internet transactions.

Furthermore, in some embodiments, the permanent structure of the building can be one or more of the following: (i) a wall, (ii) a ceiling, (iii) a foundation, (iv) ground upon which the building stands, (v) any structure that is permanently attached to the building. The example given in FIGS. 2A and 2B was a wall, but the immobile hardware token can be fixed on or fixed in a ceiling, a foundation, a ground upon which the building stands, or any structure that is permanently attached to the building.

The hardware token can be equipped with a rechargeable battery with an operational life of more than a year. Employing a wake-up technique using a low frequency (e.g., 10 kHz to 200 kHz) interface known from car keys for contactless entry, a similarly high battery lifetime, as observed for car keys, can be obtained—namely much more than one year. Recharging the hardware token's battery can be done via an inductive power link.

Returning to the scenario of a malicious long-term home sharing guest, one of the risks is that the malicious home sharing guest can report items of the 2nd authentication factor as stolen to the bank, and re-order them, using a counterfeit signature of the host and the host's mailbox. Accepting this is part of the banks' trade-off between ease of re-ordering items for customers (hence securing customer satisfaction in case of stolen items) on the one hand, and the risk of abuse (covered by the bank) on the other hand.

Additionally, there is a risk that the malicious guest can ask the bank for an increased credit line, or ask for a new credit, or sell stocks and bonds etc., in order to have more money in the host's account. Moreover, the malicious guest might also increase the limit for money transfers.

The malicious guest may initiate a number of money transfers that are typical for the host, in order to detract the bank's fraud detection mechanisms.

This makes the malicious guest scenario more dangerous for the host bank account owner, as compared with other attack mechanisms, such as man-in-the-browser attacks, where the attacker has control over the first and second authentication channel, but can only act once the account owner performs some activity. In the malicious guest scenario, the malicious guest attacker has more money to plunder, better opportunity to plunder it, and better opportunities to evade the fraud detection.

Therefore, it is important to implement the security concept disclosed in this specification that includes a hardware token (e.g., a "wall token") which ensures that the more sensitive actions of e-banking (e.g., money transfers of large sums to foreign bank accounts) can only be done from the account owner's home, but not from a remote place.

Figure 3:
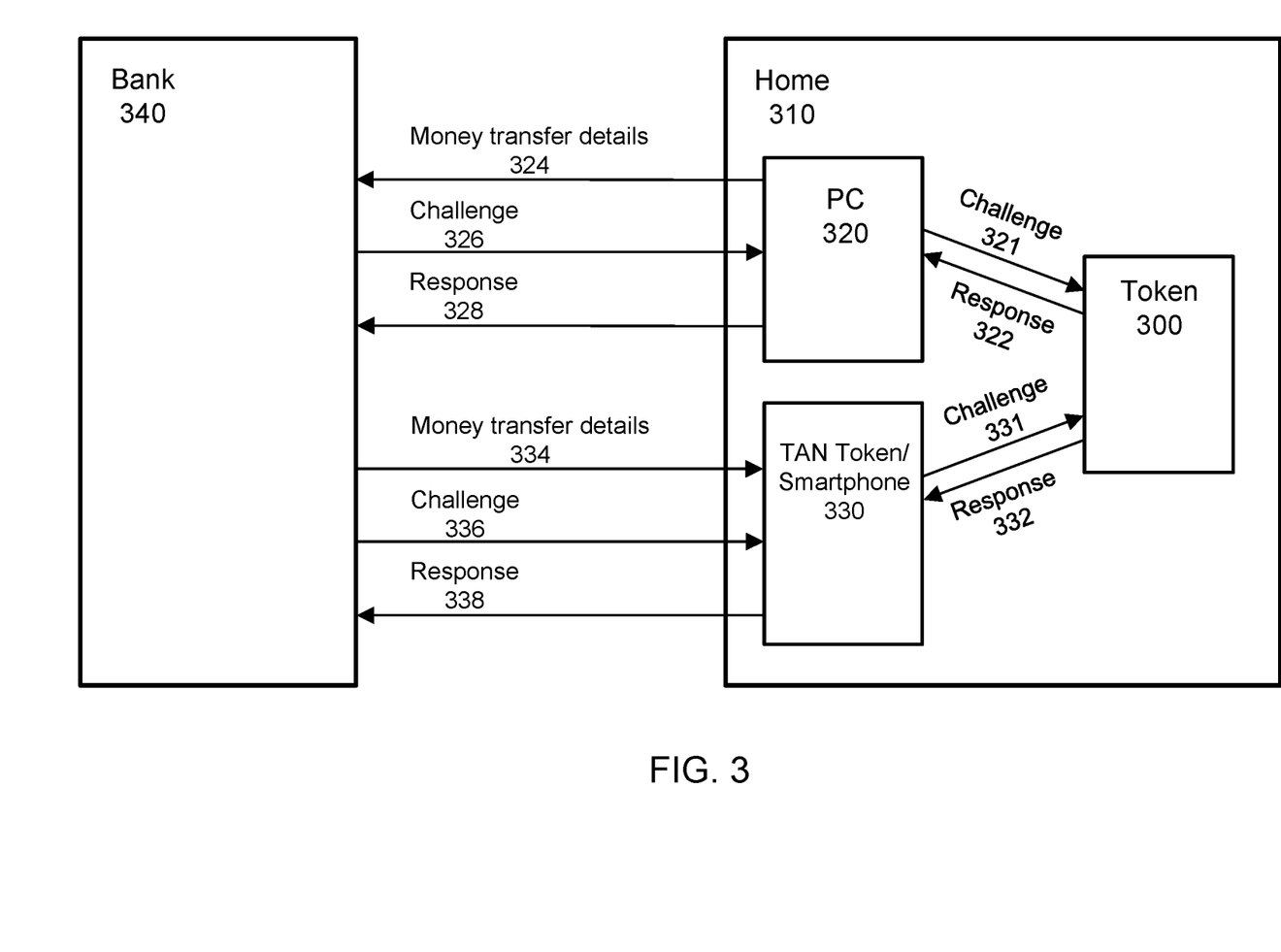
FIG. 3 shows an example setup of an authentication that includes an immobile hardware token, in accordance with some embodiments of the invention.

FIG. 3 shows the scenario of verifying that the bank account is indeed accessed from home. The verification is done using a hardware token (e.g., a "wall token"), that can perform a challenge/response exchange via NFC (near field communication) both with a PC and a TAN (transaction authentication number) token, hence making sure that the hardware token is in the proximity of both the PC and the TAN token. Distance bounding with both the PC and the TAN Token makes sure that the proximity is not only pretended by a relay channel between hardware token and the PC, and another relay channel between the TAN Token and the PC.

FIG. 3 shows an example setup of an authentication that includes an immobile hardware token, in accordance with some embodiments of the invention. In FIG. 3, there is an immobile hardware token 300 (e.g., a "wall token") mounted (or fixed) permanently in a wall located in home 310. A user can utilize a PC 320 (i.e., a first authentication device) to initiate an e-banking transaction 324 (which includes money transfer details) with bank 340. Bank 340 can authenticate the PC user via a challenge/response (326/328) exchange. At the same time, the hardware token 300 can also verify that it is in the proximity of the PC 320 via a challenge/response (321/322) exchange. Meanwhile, bank 340 can initiate a 2nd factor authentication by sending an internet message 334 (which can include the money transfer details) with a TAN token via smartphone 330. Bank 340 can authenticate the 2nd factor authentication via a challenge/response (336/338) exchange. At the same time, the hardware token 300 can also verify that it is in the proximity of the smartphone 330 via a challenge/response (331/332) exchange.

As mentioned previously, the hardware token is being mounted (or fixed) permanently in the wall, and secured against removing it by a number of different sensors. Additionally, re-ordering the hardware token must be made much more difficult than re-ordering a 2nd factor authentication item, given the fact the re-ordering the hardware token will not be needed in real life—since the hardware token can neither be lost, nor stolen, nor broken without intentionally applying force to it.

A PC (personal computer) is an example of an authentication device. In some embodiments, the authentication device is comprised of one of the following: (i) a PC (personal computer), (ii) a card reader, (iii) a mobile phone, (iv) a smart phone, (v) a biometric detector, (vi) a dedicated TAN (transaction authentication number) generator, (vii) any other type of mobile device. In some embodiments, a biometric detector can include a fingerprint detector, an iris detector, a face recognition detector, etc. In some embodiments, a card reader can include a banking card reader, a smart card reader, a memory card reader, an access control card reader, etc.

Figure 4:
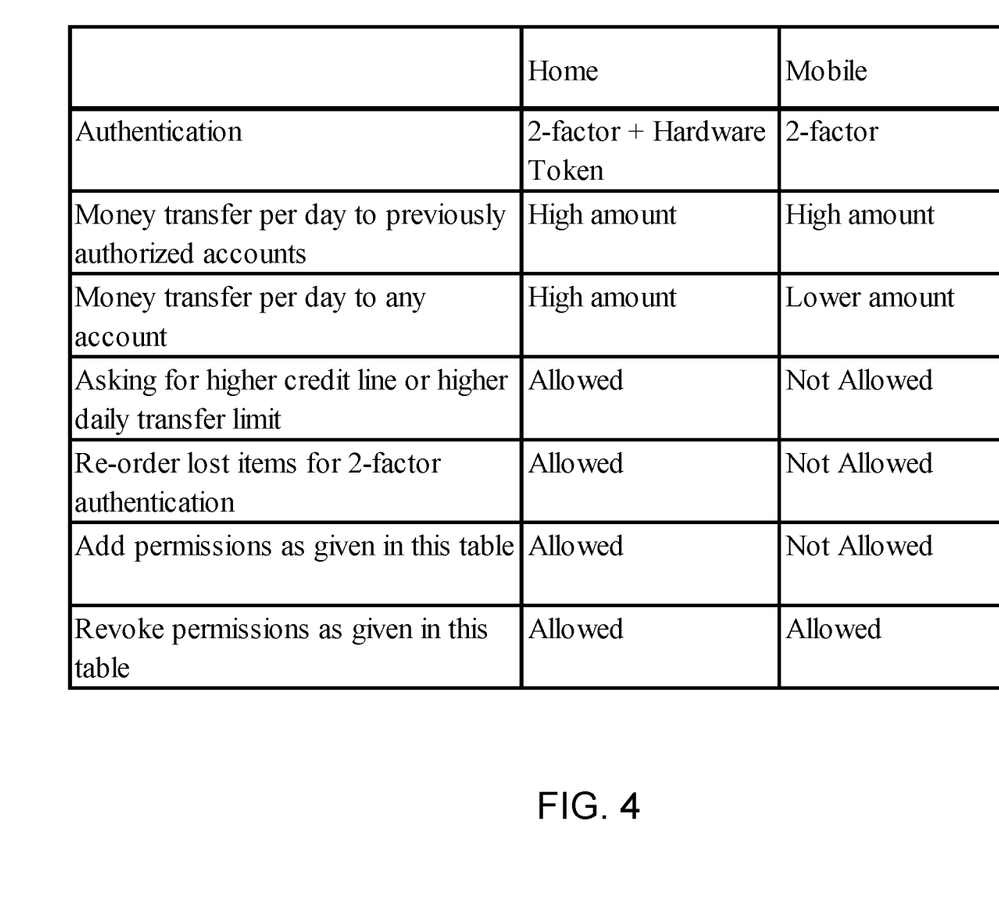
FIG. 4 shows an example of default settings for e-banking (or online banking) that includes using an immobile hardware token for authentication, in accordance with some embodiments of the invention.

FIG. 4 shows an example of default settings for e-banking (or online banking) that includes using an immobile hardware token for authentication, in accordance with some embodiments of the invention.

In particular, FIG. 4 is showing a table with default settings that demonstrate how e-banking access can be restricted for use outside of the home. In FIG. 4, the first column (starting from the left) shows a list of possible e-banking functions (or banking functions), such as method of authentication, money transfer per day to previously authorized accounts, etc. The second column (starting from the left) shows possible restrictions to these e-banking functions (or banking functions), if the user has been authenticated as accessing the bank account from the user's home (using the hardware token). The third column (starting from the left) shows possible restrictions to these e-banking functions (or banking functions), if the user has only been authenticated using a mobile device, and is therefore not accessing the bank account from the user's home.

In general, restrictions can and shall apply for all activities that are: (a) rarely done, (b) usually done from home anyway because they need dedicated documents (e.g., asking for a credit, trading large numbers of stocks and bonds), and (c) pose a higher financial risk. Therefore, as an example, "Money transfer per day to any account" is restricted to a "Lower amount" for a "Mobile" only access, because this poses a higher financial risk. Therefore, as another example, "Asking for higher credit line or higher daily transfer limit" is "Not Allowed" for a "Mobile" only access, because this is rarely done, and it poses a higher financial risk.

In FIG. 4, unrestricted access might apply to transactions usually done while travelling (e.g., money transfers of lower to medium amounts to previously used bank accounts). As an example, "Money transfer per day to previously authorized accounts" has unrestricted access, because these are transactions usually done while travelling.

Besides internet banking, there are also many other popular internet-based services that may be addressed by the invention. In many cases, there are security-relevant actions which are done relatively rarely, so these security-relevant actions can be and should be best done from home. These internet-based services can be restricted in the same manner as shown in FIG. 4.

Figure 5:
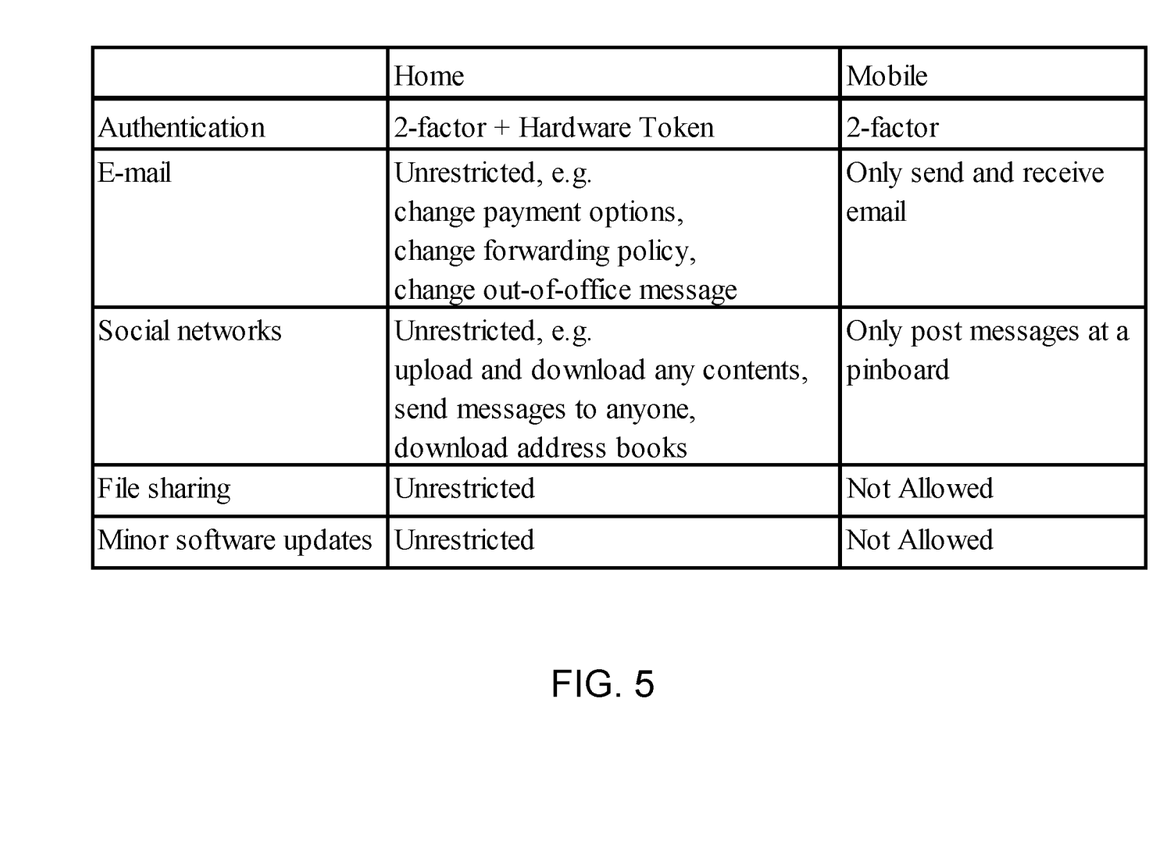
FIG. 5 shows an example of default settings for other internet-based services that includes using an immobile hardware token for authentication, in accordance with some embodiments of the invention.

FIG. 5 shows an example of default settings for other internet-based services that includes using an immobile hardware token for authentication, in accordance with some embodiments of the invention.

In particular, FIG. 5 is showing a table that is summarizing examples of internet-based services, and how some access rights can be restricted for access done outside of the owner's home. In FIG. 5, the first column (starting from the left) shows a list of possible internet transaction functions, such as method of authentication, e-mail, social networks, etc. The second column (starting from the left) shows possible restrictions to these internet transaction functions, if the user has been authenticated as accessing the account from the user's home (using the hardware token). The third column (starting from the left) shows possible restrictions to these internet transaction functions, if the user has only been authenticated using a mobile device, and is therefore not accessing the bank account from the user's home.

In general, restrictions can and shall apply for all activities that are: (a) rarely done, (b) usually done from home anyway because they need dedicated documents (e.g., change payment options), and (c) pose a higher security risk. Therefore, as an example, "E-mail" functions are restricted to a "Only send and receive email" for a "Mobile" only access, because performing other activities (such as change forwarding options) poses a higher security risk. Therefore, as another example, "File sharing" is "Not Allowed" for a "Mobile" only access, because this also poses a higher security risk.

In FIG. 5, unrestricted access can pose as a higher security risk. Therefore, "Unrestricted" access for any of the internet-based services is only allowed when accessing the account from "Home", and not allowed when accessing the account from a "Mobile" device remotely (i.e., not from "Home").

Figure 6:
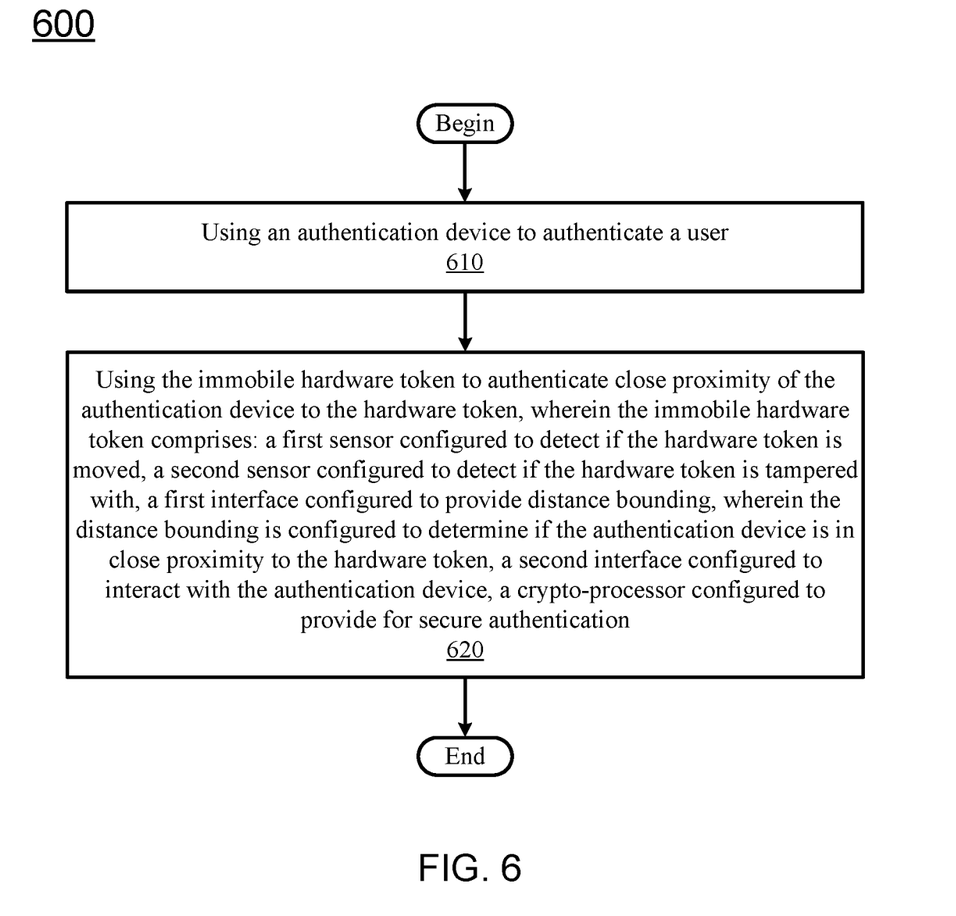
FIG. 6 shows a process flow diagram of a method for using an immobile hardware token for enabling secure internet transactions (using at least one authentication device), in accordance with some embodiments of the invention.

FIG. 6 shows a process flow diagram of a method for using an immobile hardware token for enabling secure internet transactions (using at least one authentication device), in accordance with some embodiments of the invention.

As shown in FIG. 6, the method 600 begins at step 610, where the method uses an authentication device to authenticate a user. Next, at step 620, the method uses the immobile hardware token to authenticate close proximity of the authentication device to the hardware token, wherein the immobile hardware token comprises: (i) a first sensor configured to detect if the hardware token is moved, (ii) a second sensor configured to detect if the hardware token is tampered with, (iii) a first interface configured to provide distance bounding, wherein the distance bounding is configured to determine if the authentication device is in close proximity to the hardware token, (iv) a second interface configured to interact with the authentication device, (v) a crypto-processor configured to provide for secure authentication.

Figure 7:
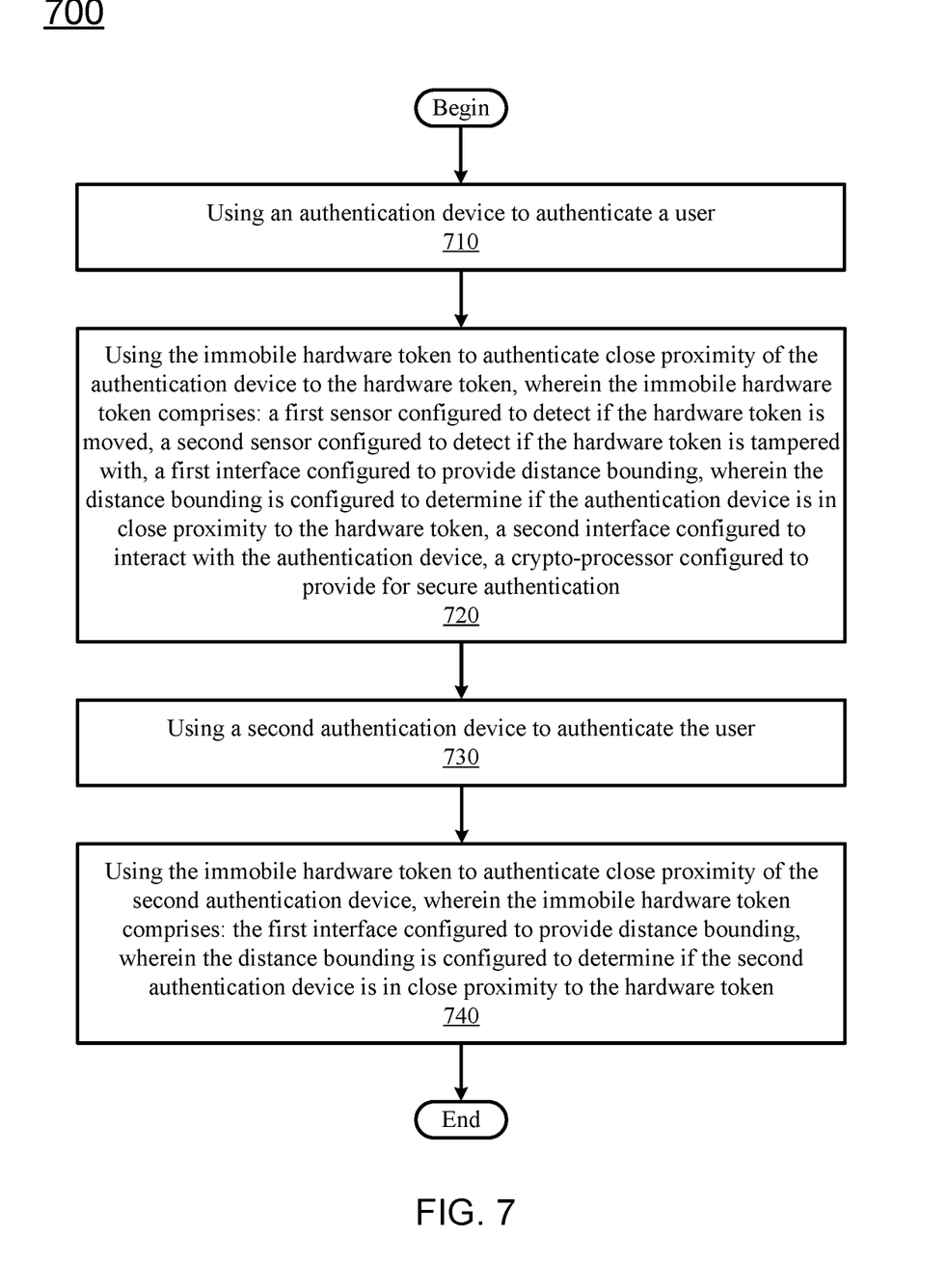
FIG. 7 shows a process flow diagram of a method for using an immobile hardware token for enabling secure internet transactions (using at least two authentication devices), in accordance with some embodiments of the invention.

FIG. 7 shows a process flow diagram of a method for using an immobile hardware token for enabling secure internet transactions (using at least two authentication devices—"multi-factor authentication"), in accordance with some embodiments of the invention.

As shown in FIG. 7, the method 700 begins at step 710, where the method uses an authentication device to authenticate a user. Then, the method proceeds to step 720. In step 720, the method uses the immobile hardware token to authenticate close proximity of the authentication device to the hardware token, wherein the immobile hardware token comprises: (i) a first sensor configured to detect if the hardware token is moved, (ii) a second sensor configured to detect if the hardware token is tampered with, (iii) a first interface configured to provide distance bounding, wherein the distance bounding is configured to determine if the authentication device is in close proximity to the hardware token, (iv) a second interface configured to interact with the authentication device, (v) a crypto-processor configured to provide for secure authentication. Next, at step 730, the method uses a second authentication device to authenticate the user. Finally, at step 740, the method uses the immobile hardware token to authenticate close proximity of the second authentication device, wherein the immobile hardware token comprises: the first interface configured to provide distance bounding, wherein the distance bounding is configured to determine if the second authentication device is in close proximity to the hardware token.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A hardware token for enabling secure internet transactions, the immobile hardware token comprising:
    a first sensor configured to detect if the hardware token is moved;
    a second sensor configured to detect if the hardware token is tampered with;
    a first interface configured to provide distance bounding using ultra-wideband (UWB);
    a second interface configured to interact with a first authentication device and with a second authorization device using near field communication (NFC);
    a crypto-processor configured to provide for secure authentication;
    wherein the hardware token is configured to be fixed on or fixed in a permanent structure of a building; and
    wherein the hardware token is configured to authenticate, via the first interface, that the first authentication device and the second authentication device are in close proximity to the hardware token, wherein the distance bounding has determined that the authentication device is within a pre-determined distance of the hardware token, wherein close proximity of the authentication device to the hardware token is when the authentication device is within the building;
    wherein the hardware token is configured to authenticate, via the second interface and the crypto-processor of the hardware token, that the first authorization device and the second authorization device are in close proximity to the hardware token using challenge/response exchanges between the hardware token and the first authorization device and the second authorization device.

2. The hardware token of claim 1, wherein the permanent structure of the building is one or more of the following:
    a wall,
    a ceiling,
    a foundation,
    ground upon which the building stands,
    any structure that is permanently attached to the building.

3. The hardware token of claim 1, wherein the first sensor is further configured to detect if the hardware token is fixed on or fixed in the permanent structure of the building.

4. The hardware token of claim 3, wherein the first sensor is configured to detect if the hardware token is fixed on or fixed in the permanent structure of the building by using one or more of the following:
    ultrasound echo sensing,
    force sensing,
    motion sensing,
    vibration sensing,
    temperature sensing.

5. The hardware token of claim 1, wherein the hardware token is configured to be used as a location-based factor for multi-factor authentication.

6. The hardware token of claim 1, wherein the second sensor is configured to detect if the hardware token is mechanically tampered with by using one or more of the following:
light sensing,
mechanical sensing.

7. The hardware token of claim 1, wherein each of the first authentication device and the second authentication device is comprised of one of the following:
a personal computer,
a card reader,
a mobile phone,
a smart phone,
a biometric detector,
a dedicated TAN (transaction authentication number) generator,
any other type of mobile device.

8. The hardware token of claim 1, wherein the crypto-processor is configured to provide for secure challenge/response authentication.

9. The hardware token of claim 1, wherein the first sensor comprises one or more temperature sensors,
wherein the one or more temperature sensors are configured to detect a temperature of the hardware token or a temperature gradient across the hardware token,
wherein a fast and/or sudden change in the temperature of the hardware token or the temperature gradient across the hardware token indicates that the hardware token has been moved from the permanent structure of the building that the hardware token is fixed on or fixed in.

10. The hardware token of claim 1 further comprising a dedicated input element.

11. The hardware token of claim 1, wherein the distance bounding is configured to prevent and/or detect a relay channel attack.

12. A method for using a hardware token for enabling secure internet transactions, the method comprising:
using first authentication device to authenticate a user;
using the hardware token to authenticate close proximity of the first authentication device to the hardware token;
using a second authentication device to authenticate the user;
using the hardware token to authenticate close proximity of the second authentication device to the hardware token;
wherein the hardware token is fixed on or fixed in the permanent structure of a building, wherein the hardware token comprises:
a first sensor configured to detect if the hardware token is moved,
a second sensor configured to detect if the hardware token is tampered with,
a first interface configured to provide distance bounding using ultra-wideband (UWB) based distance bounding, wherein the distance bounding is configured to determine if the first authentication device is in close proximity to the hardware token and if the second authentication device is in close proximity to the hardware token,
a second interface configured to interact with the first authentication device and the second authentication device using near-field communication (NFC),
a crypto-processor configured to provide for secure authentication; and
further comprising:
authenticating, via the first interface of the hardware token, that the authentication device and the second authentication device are in close proximity to the hardware token using UWB-based distance bounding, wherein the distance bounding has determined that the authentication device is within a pre-determined distance of the hardware token;
wherein the hardware token is within the building and wherein close proximity of the authentication device to the hardware token is when the authentication device is within the building;
authenticating, via the second interface and the crypto-processor of the hardware token, that the authorization device and the second authorization device are in close proximity to the hardware token using challenge/response exchanges between the hardware token and the authorization device and the second authorization device.

13. The method of claim 12, wherein each of the first authentication device and the second authentication device is comprised of one of the following:
a personal computer,
a card reader,
a mobile phone,
a smart phone,
a biometric detector,
a dedicated TAN (transaction authentication number) generator,
any other type of mobile device.

14. The method of claim 12,
wherein security of an internet transaction conducted by the first authentication device is increased if the hardware token has authenticated that the first authentication device and the second authentication device are in close proximity to the hardware token,
wherein the increased security of the internet transaction conducted by the first authentication device enables the first authentication device to perform higher risk functions that would otherwise not be authorized.

15. The method of claim 14,
wherein the internet transaction conducted by the first authentication device is comprised of banking functions,
wherein the higher risk functions are comprised of higher risk banking functions.

16. The method of claim 14,
wherein the internet transaction conducted by the first authentication device is comprised of one or more of the following:
banking functions,
authentication functions,
email functions,
social network functions,
file sharing functions,
software update functions,
internet ordering of items and/or services.

17. The method of claim 14, wherein the building is the home of the user, wherein the internet transaction conducted by the first authentication device is a banking function, and wherein the higher risk functions are comprised of higher risk banking functions.

18. The method of claim 12, wherein the first authentication device and the hardware token are in close proximity to each other when the first authentication device and the hardware token are within a limit of 2-5 meters from each other.

* * * * *